(12) United States Patent
Howell

(10) Patent No.: US 6,478,161 B2
(45) Date of Patent: *Nov. 12, 2002

(54) MAGNETIC SEPARATOR

(76) Inventor: Billy R. Howell, 5923 Spring Crossing, San Antonio, TX (US) 78247

( * ) Notice: Subject to any disclaimer, the term of this patent is extended or adjusted under 35 U.S.C. 154(b) by 0 days.

This patent is subject to a terminal disclaimer.

(21) Appl. No.: 09/883,504

(22) Filed: Jun. 19, 2001

(65) Prior Publication Data

US 2002/0029998 A1 Mar. 14, 2002

Related U.S. Application Data

(63) Continuation-in-part of application No. 09/169,014, filed on Oct. 8, 1998, now Pat. No. 6,250,474.
(60) Provisional application No. 60/061,624, filed on Oct. 9, 1997.

(51) Int. Cl.[7] .................................................. B03C 1/00
(52) U.S. Cl. ..................... 209/219; 209/218; 209/217; 209/213; 198/813; 198/816; 198/835
(58) Field of Search .................................. 198/813, 835, 198/816; 209/219, 218, 217, 213

(56) References Cited

U.S. PATENT DOCUMENTS

| | | | | |
|---|---|---|---|---|
| 4,031,004 A | * | 6/1977 | Sommer et al. | 70/276 |
| 5,057,210 A | * | 10/1991 | Julius | 24/442 |
| 5,394,991 A | * | 3/1995 | Kumagai et al. | 209/212 |
| 5,615,775 A | * | 4/1997 | Barbaret | 209/219 |
| 5,626,233 A | * | 5/1997 | Wells, II | 209/219 |

* cited by examiner

Primary Examiner—Donald P. Walsh
Assistant Examiner—Jonathan R Miller
(74) Attorney, Agent, or Firm—Howrey Simon; Arnold & White LLP

(57) ABSTRACT

An eddy current separator apparatus for separating non-ferrous metals from other materials. The apparatus includes a support frame and a table cantileverly suspended from the frame. An expansion and contraction mechanism is incorporated that is adapted to accept a continuous conveyor belt thereabout. The expansion and contraction mechanism is capable of being configured between an operating configuration and maintenance configuration. A continuous conveyor belt is constructed to be able to be looped about the expansion and contraction mechanism and the table such that the conveyor belt is drawn tight in the operating configuration and slackened in the maintenance configuration. In this manner, the continuous conveyor belt is easily removable from, and installable onto the table in the maintenance configuration. A magnetic rotor is positioned proximate a first side of the continuous conveyor belt and is adapted to generate an eddy current on an opposite second side of the continuous conveyor belt upon rotation for inducing an elevating force in non-ferrous metals for separation from other materials.

28 Claims, 10 Drawing Sheets

MAGNETIC SEPARATOR

RELATED PATENT APPLICATIONS

This patent application is a continuation in part of U.S. patent application Ser. No. 09/169,014 filed on Oct. 8, 1998 now Pat. No. 6,250,474 entitled MAGNETIC SEPARATOR which claims the benefit of U.S. Provisional Application No. 60/061,624 filed Oct. 9, 1997 entitled MAGNETIC SEPARATOR. By this reference, the full disclosures including the drawings of U.S. Provisional Patent Application No. 60/061,624 and U.S. patent application Ser. No. 09/169,014 are expressly incorporated herein.

TECHNICAL FIELD

This invention relates generally to metal separators. More specifically, but not by way of limitation, the invention is directed to an apparatus for separating non-ferrous metal material from ferrous metals, rocks, glass, wood, rubber, dirt and other such debris by means of an eddy current.

DESCRIPTION

1. Background Art

In this present era of recycling and limited land-fill space, the necessity to reclaim reusable materials from debris and waste has become an utmost concern of our society. The reclamation of metal materials is additionally important due to the increasing scarcity of these natural resources and the cost-effectiveness of recycling versus mining and purification of metals. To recover metals from debris and waste, the recycling industry has developed numerous metal separating devices.

These separation devices include both magnetic separators and eddy current separators. Magnetic separators allow ferrous metal pieces to be easily removed by suitable magnets which sort the ferrous metals from the debris using attractive magnetic forces to pull the ferrous metals from the balance of the debris. Alternative methods are required in removing non-ferrous metals since they do not contain the magnetic properties of ferrous metals.

Magnetic separation typically works by attracting items to be separated from a group or mixture. Eddy current separators, on the other hand, repulsively act upon conductive materials or particles which are not magnetic in nature, such as aluminum, copper and brass. Eddy current separation functions by inducing or sweeping a high density, rapidly changing, magnetic flux through the mixture so that eddy currents are created in any appropriately conductive non-ferrous particles. The eddy current subjects these conductive particles to a resultant repulsive force away from the eddy current source. The magnitude of this repulsive force is defined by electrical resistivity, size and shape of the conductive particle, the strength of the magnetic flux field, and the frequency of pole changes in the magnetic flux field. If sufficiently strong, the repulsive force causes the non-ferrous particles to be thrust away from the magnetic flux field, thereby separating these particles from non-electrically conductive material in the mixture or debris. Thus, while similar structural elements may be employed in separators of both the magnetic and eddy current types, their modes of operation, the relative orientations of the structural elements, and the resulting effects caused by the two apparatus are substantially different.

A review of known patents discloses several inventions embodying this type of eddy current separation device. U.S. Pat. No. 5,080,234 to Benson utilizes a pair of cylinders, one positioned above the other, that are rotated synchronously in opposite directions from each other and are coordinated so that poles of opposite polarity face each other across an air gap. An eddy current is induced in electrically conductive particles as the particles are conveyed across the gap. The current repulses the particles thereby allowing their separate collection apart from the free-falling non-conductive material in the debris.

In another separating apparatus disclosed in U.S. Pat. No. 5,092,986 to Feistier et al., a rotating drum consisting of magnets is eccentrically placed adjacent to a belt drum. Debris is conveyed across the belt drum by means of a conveyor belt. The magnetic drum produces a magnetic flux field from which eddy currents are created in electrically conductive particles of the debris as the particles are conveyed along the belt over the belt drum. The conductive particles are projected further off of the belt than other material due to the repulsive magnetic force generated by the drum. In this manner, the electrically conductive particles are separated from the remaining debris. A scraper is employed to remove iron particles attracted to the magnets thereby aiding in preventing damage to the belt drum.

In today's recycling industry, predominately metal products such as automobiles, refrigerators, washing machines, etc., are shredded into small pieces. These small pieces are then run through trommel screens that sift out dirt, glass and other sufficiently fine particles from the shredded product. The larger pieces that remain within the drum of the trommel are collectively referred to as residue; a material that often includes dirt, rocks, glass, wood, rubber, and various metal pieces such as aluminum, copper and brass.

The residue is classified and purchased on a relative percentage basis of metal to total material; for example, "30% residue" indicates that the combination is comprised of thirty percent metals, while the remaining matter is a mixture of non-metals that may include dirt, trash, rubber, and other matter. Typically, forty-five thousand pound truckloads of residue are purchased at a time by a recycling or processing plant. In the instance of a thirty percent residue load, roughly thirty thousand and five hundred pounds of unusable material is shipped to the plant and must ultimately be discarded or otherwise processed. Obviously, the recycling plant desires the percentage of residue shipped to be as high as possible so that resources are not wasted on the transport of unusable material. In at least one past instance, residue was purified by water and/or heavy media plants which proved to be costly. Out of this dilemma the eddy current separating industry evolved.

Most present-day eddy current machines are typically comprised of a rotor within a nonmetallic drum pulley design. In some instances, the magnetic rotors have a rotational axis off the centerline of the drum pulley shaft for the conveyor belt and are referred to as eccentric designs. Others are concentrically oriented and the rotors rotate about a common axis with the pulleys about which the conveyor belts wrap. The inner rotor contains the magnet, or magnets and is enclosed within the larger, outer belt drum. The outer drum is typically comprised of a fiberglass or a ceramic coated material. Iron attracted to the magnets tends to accumulate on the outer drum. The presence of the iron creates resistance resulting in heat, thereby burning through the fiberglass belt drum and sometimes damaging or destroying the magnets, and possibly the rotor itself. This damage is due to the tight tolerances at which the two rotating components are run with respect to one another. To potentiate the combined performance of the two components, the inner magnetic rotor is run as closely as possible to the outer belt pulley drum so that the induced magnetic field is as close as possible to the material being separated.

In view of known complications associated with current separator designs, the magnetic separator of the present invention has been designed to provide a cost-effective means of overcoming damage to the magnetic rotor during the separation process of the fragmented material by eliminating required operation of the rotor within the belt pulley drum. The present invention provides a means whereby the magnetic rotor is separately included, as opposed to an eccentric or concentric arrangement of two rotating components. It also provides a means by which preventive maintenance, parts replacement and equipment repairs are greatly simplified due to the separator's design. These features also result in cost-savings and reduced downtime.

2. Disclosure of the Invention

The present invention in its several disclosed embodiments alleviates the drawbacks described above with respect to the separation of non-ferrous metal material from ferrous metals, rocks, glass, wood, rubber, dirt and other such debris by means of any eddy current which incorporates several beneficial features. An eddy current separator apparatus is disclosed whereby electrically conductive metals are separated from other materials such as glass, rubber, wood, rocks and dirt in a novel and unique manner. The present invention separates non-ferrous metals from the debris by a shredding process through the utilization of a single magnetic rotor. The effect of the magnetic rotor is to upwardly lift or boost the non-ferrous metals as they travel upon a continuous belt. The lifting boost of the rotor, together with the lateral inertia induced by the moving belt applies a resultant force upon the non-ferrous metals that "throws" the affected metals further beyond the end of the belt than the remainder of the debris.

The magnetic rotor takes the form of a rotating shaft or drum that contains elongate magnets having north and south poles radially oriented upon a rotor shaft. Each magnet is positioned so that a longitudinal centerline of the magnet's body is oriented parallel to an axis about which the magnet is revolved, but substantially perpendicular to its north and south polarity axis.

The rotational axis of the magnetic rotor is arranged substantially perpendicular to the travel path of the conveyor belt. The drum normally rotates just inside of a return end of the conveyor belt about which the direction of travel for the belt changes. In this way the exterior of the rotor's outer skin can be positioned just beneath the interior surface of the belt.

When appropriately rotated, the magnetic rotor induces a repulsive force in the non-ferrous material. The rotor is oriented so that the generated force is substantially aligned with the direction of travel of the top surface of the belt. The repulsive force is directed generally away from the rotor and across the conveyor belt in a manner that serves to boost the trajectory of the affected material pieces so that they are projected off of the end of the conveyor belt as it wraps back in the opposite direction about a nose idler or return pulley. The unaffected particles are not boosted, but are merely projected off of the end of the belt by the inertial force established by their travel upon the top moving surface of the conveyor belt. Separation of the two differently affected groups (non-ferrous versus other material) is most advantageously planned based on the different projection distances of the different materials from the end of the belt.

The separator machine of the present invention comprises a metal frame upon which other components are attached. A seamless, continuous conveyor belt is positioned to cover an upper surface or belt pan at the top of the frame. A first motor attached rearwardly to the frame drives the conveyor belt in a continuously wrapping loop at the top of the frame. This first motor drives the belt at speeds that are preferably variable between one hundred feet per minute and seven hundred feet per minute. A second motor is attached forwardly for independently driving the magnetic rotor. Additional smaller belt drums or idler pulleys are positioned along the belt's path in order to give stability and direction to the belt's operation.

In a preferred embodiment, the belt is seamless and optionally carries one or more wipers upon an exterior surface, each wiper being transversely oriented to the direction of the belt's travel. The wipers are included to sweep debris from the belt that may ride thereon by rolling at a similar speed, but in an opposite direction to the motion of the belt's upper surface. The wiper also sweeps ferrous material that is attractively retained in the magnetic field above the rotor.

A belt pan is provided having a top surface that facilitates the sliding of the conveyor belt across the pan's top surface. In a preferred embodiment, at least the top surface of the belt pan is constructed from, or coated with an ultra-high molecular weight material that is slippery when engaged by a dry surface, such as the interior surface of the conveyor belt. The pan also lends stability and support to the belt's operation. This may be appreciated in view of the fact that heavy pieces of debris are continuously being dropped thereupon and quickly accelerated to a velocity equal to the travel speed of the belt itself.

The magnetic rotor is positioned adjacent to the belt's inner surface with a clearance space there between which in some cases may measure zero. One or more reduced friction tiles are utilized to provide an inclined sliding surface upon which the substantially horizontal travel of a top surface of the conveyor belt is broken and redirected downwardly for return in a looping fashion around the nose idler and beneath the top belt surface. The magnetic rotor is oriented so that its boosting force acts at the top of the downward incline thereby enhancing the distance of projection of affected items off of the end of the conveyor belt. The separating capabilities are enhanced by the other debris' natural tendency to fall downwardly at the incline under gravitational effects when no longer supported upon the traveling belt.

The described configuration heightens the separating capability of the invention by having a substantial spacial spread between the distances at which the two groups of materials are being projected from the end of the conveyor belt. By appropriately orienting separating means, such as a dividing partition or partitions with respect to the end of the belt between the two landing areas for the different materials, material separation is accomplishable. In a preferred embodiment, the material that is unaffected by the eddy current drops onto a removing conveyor belt located relatively close to the separator's frame, while the affected non-ferrous material is "pitched" to a receiving receptacle located further from the separator, normally on a far side of the removing conveyor belt away from the belt's point of discharge.

Hubs covering the ends of the magnetic rotor are positioned at a distance beyond longitudinally distal ends of the magnets. This spacing distance results in only a nominal magnetic field being induced or created at the ends of the rotor, thereby greatly reducing the likelihood that ferrous particles will be attracted to, and pulled around and under the conveyor belt for adherence to the magnetic rotor.

Equally important, the potentially harmful ferrous particles are much less likely to be pulled into the interior of the magnetic rotor where severe damage can result because the hubs are sealingly engaged upon ends of what is preferably a metallic skin drum surrounding the rotor assembly. In this manner, a sealed interior compartment is established for housing the magnets.

Material guard rails are provided along both sides of the top portion of the belt to maintain material on the belt during operation. Threaded hand knobs secure the rails to the frame and are adapted so that the rails can be quickly removed and reinstalled for repairs and maintenance that require removal of the conveyor belt. A top portion of the guard rails diverge outwardly for better retention of traveling matter thereupon.

The supporting frame is of a cantilever design that permits easy access to all points about the conveyor belt. This is attributable to the fact that the table top portion of the separator about which the continuous belt wraps and rotates is exclusively supported at its back side and extends forward therefrom in a cantilever manner. In this configuration, there are no support members located beneath the front of the table that impede the removal or installation of a continuous belt about the table top. In this way, the belt acts in a sleeve-type manner about the supporting table top. This design allows a single operator to easily and quickly remove and install a belt.

The rear belt drive pulley is drum-styled and carried on rotatable spherical pillow block bearings positioned at each end of an axle-type shaft. Each bearing allows the longitudinal axis of the drum, which is coincident with the center axis of the axle shaft of the drum, to be pivoted within a limited 360 degree conical solid having an apex point located substantially at the center of the bearing. In light of this capability, the rear belt drum may be laterally pivoted in a substantially linear direction parallel to the direction of travel of the continuous belt. This forward and backward movement of the front end of the belt pulley opposite the rotatable spherical pillow block bearing is accomplished by the manipulation of an adjustment mechanism manually actuated by a handled lever. As the front end of the belt drum is moved inwardly and outwardly with respect to the separators frame, the race or track upon which the belt is supported constricts and expands. In the expanded configuration, an installed continuous belt fits tightly thereabout and is oriented for operation. In the constricted or contracted configuration, the belt is slackened and may easily be removed from or installed about the table top of the separator.

In at least one embodiment, the present invention takes the form of an eddy current separator apparatus for separating non-ferrous metals from other materials. The apparatus includes a support frame and a table cantileverly suspended from the frame. An expansion and contraction mechanism is incorporated and adapted to accept a continuous conveyor belt thereabout. The expansion and contraction mechanism is capable of being configured between an operating configuration and maintenance configuration. A continuous conveyor belt is constructed to be able to be looped about the expansion and contraction mechanism and the table such that the conveyor belt is drawn tight in the operating configuration and slackened in the maintenance configuration. In this manner, the continuous conveyor belt is easily removable from, and installable onto the table in the maintenance configuration. A magnetic rotor is positioned proximate a first side of the continuous conveyor belt and is adapted to generate an eddy current on an opposite second side of the continuous conveyor belt upon rotation for inducing an elevating force in non-ferrous metals for separation from other materials.

Accordingly, some of the objectives of this invention, among others are to provide, inter alia: an improved eddy current separator apparatus; an eddy current separator apparatus that is cost-effective to produce and operate; an eddy current separator apparatus that minimizes downtime for repair and maintenance; an eddy current separator apparatus that can be repaired quickly by one operator; and an eddy current separator apparatus comprised of a singular magnetic rotor located directly adjacent to the continuous conveyor belt upon which non-ferrous electrically conductive metals are transported.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Furthermore, elements may be recited as being "coupled"; this terminology's use contemplates elements being connected together in such a way that there may be other components interstitially located between the specified elements, and that the elements so specified may be connected in fixed or movable relation one to the other.

Referring to the Figures, an eddy current separator apparatus 05 for separating non-ferrous material from other material may be appreciated. It will be obvious, however, to one skilled in the art that these specific details need not be used to practice the present invention. In other instances, well-known structures have not been shown in detail in order not to unnecessarily obscure the present invention.

Figure 1:
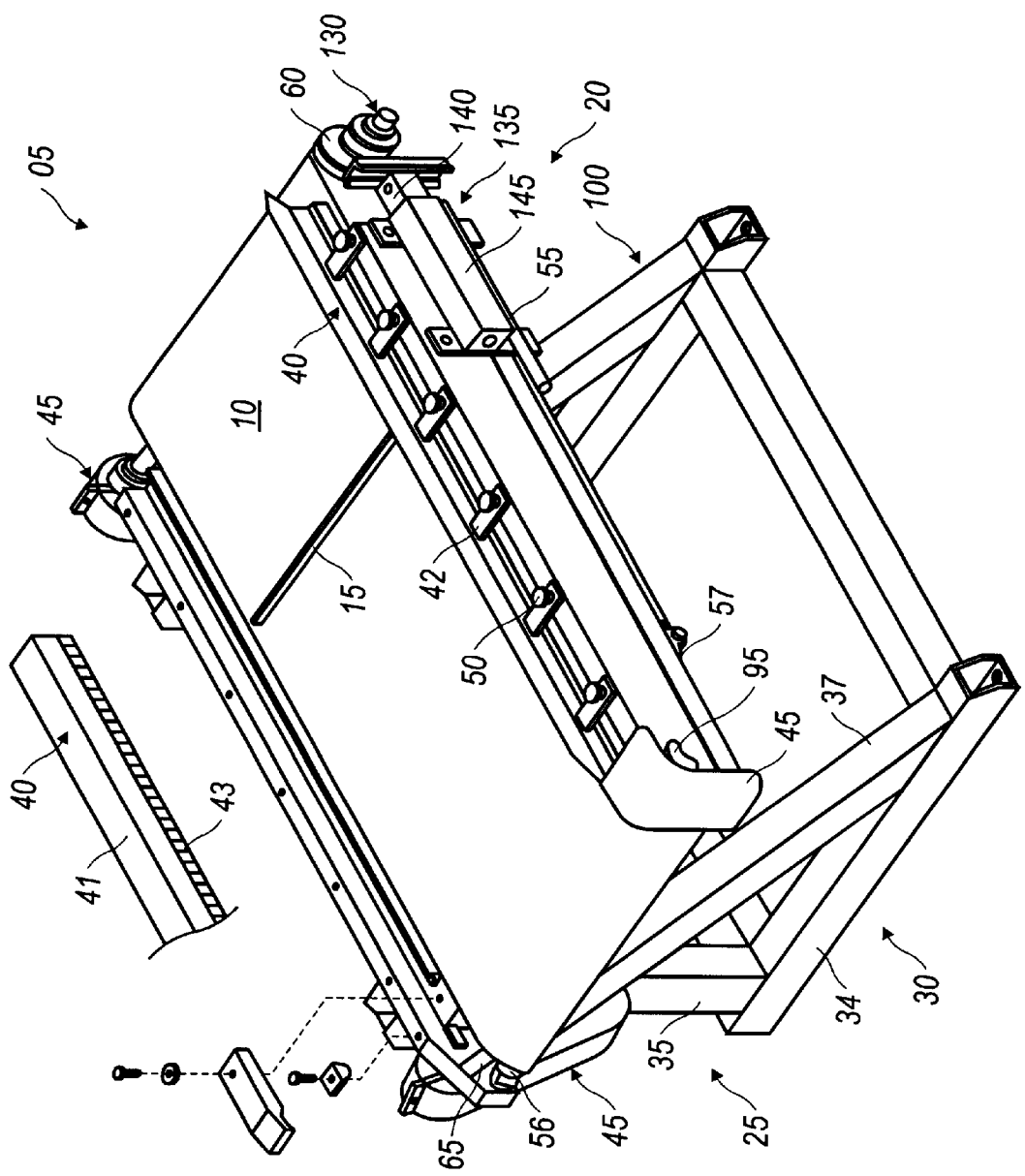
FIG. 1 is a perspective view, partially exploded, illustrating a preferred embodiment of the eddy current separator apparatus of the present invention.

An overall view of the eddy current separator 05 is illustrated in FIG. 1. Various elements are shown in the illustration; included are a cantilevered table 20 with a continuous separator conveyor belt 10 encircled there about. The belt 10 carries at least one, and typically a plurality of belt wipers 15 connected upon an exterior surface thereof. The table 20 is mounted upon a frame 25 comprised of a base support 30 having diagonal legs 37 and horizontal base legs 34. Still further, the separator 05 includes material guards 40, rotor drive guards 45, quick-release hand knobs 50, and a belt release lever 55.

The quick-release knobs 50 serve in the securement of the material guards 40 to the table 20. This is accomplished by screwably advancing the hand knobs 50 toward a top surface of the table 20 and downwardly on top of portions of the guards 40. By design, the knobs 50 provide a quick-release mechanism for the material guards 40. The belt release lever 55 functions by pulling a rear belt drive pulley or rotor 60 forwardly. With the guards 40 removed and the belt drive pulley 60 contracted forwardly, the belt 10 is slack and easily removed from the table 20.

FIGS. 2, 3, and 6–8 provide details of a preferred embodiment of a magnetic rotor 65. As shown, the magnetic rotor 65 is comprised of a plurality of magnets 70 placed lengthwise circumferentially about a rotor shaft 75 and cylindrically enclosed by a metallic skin 80 having an outer surface 85. The radially outer surface of each magnet 70 is curved so that an interior surface of the skin 80 of the rotor 65 lays proximate to or snugly across the outward peripheral sides of each magnet 70. It should be noted that although the FIGURES illustrate a magnetic rotor 65 as being comprised of eight circumferential magnets 70, the number of magnets 70 utilized may vary.

To facilitate the induction of the eddy current, the magnets 70 are configured upon the magnet rotor shaft 75 such that the north and south poles of each magnet 70 are radially oriented one above the other on a radius, as opposed to longitudinally oriented in an orientation parallel to a longitudinal axis of the magnet rotor shaft 75. Further, the magnets 70 are arranged on the magnet rotor shaft 75 such that fifty percent of the radially outward poles are north poles and the other fifty percent are south poles. Optionally, these north-south radially outward arranged poles are by rows about the circumferential faces of the shaft 75. In this manner, all of the outward faces of one row of magnets will be north and the two adjacent rows will have south poles directed outwardly. In this manner, the alternating configuration will be accomplished.

Figure 6:
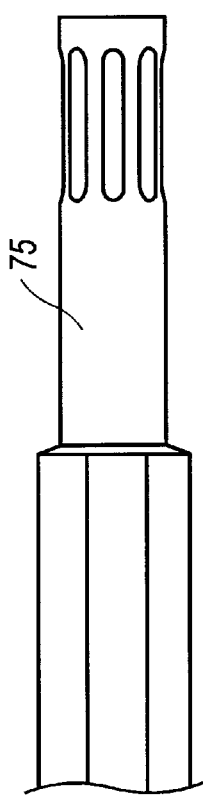
FIG. 6 is a side view of the magnetic rotor shaft.
Figure 8:
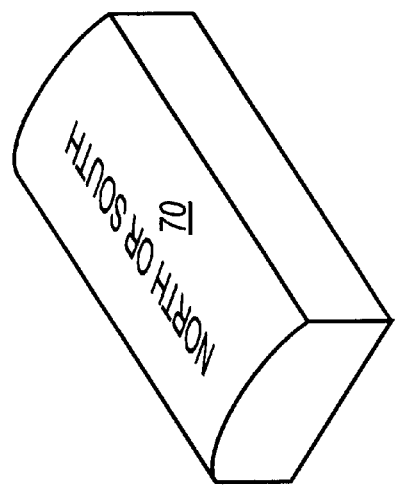
FIG. 8 is a perspective view of an appropriately configured magnet.
Figure 7:
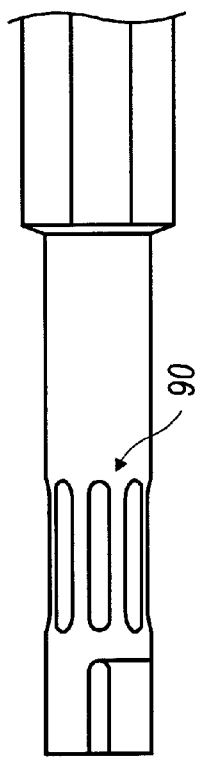
FIG. 7 is an end view of the magnet rotor assembly.
Figure 7:
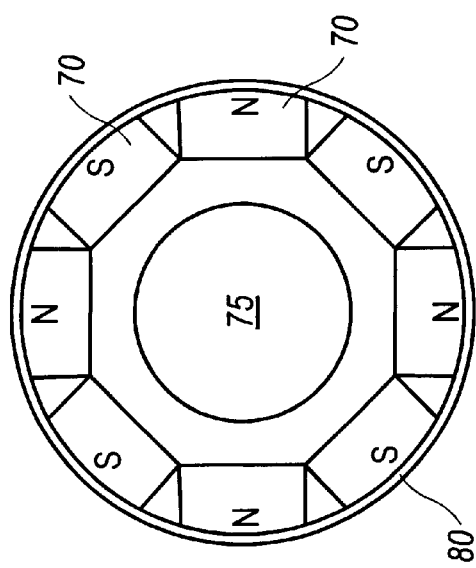

In the illustrated embodiment, the rotor shaft 75 itself is octagonally cross-sectionally shaped. As shown in FIG. 6, cooling flutes 90 are provided near each end of the shaft 75 to aid in cooling the magnet rotor shaft 75 due to its high speed operation and any friction that may be generated by the two end bearings.

Figure 3:
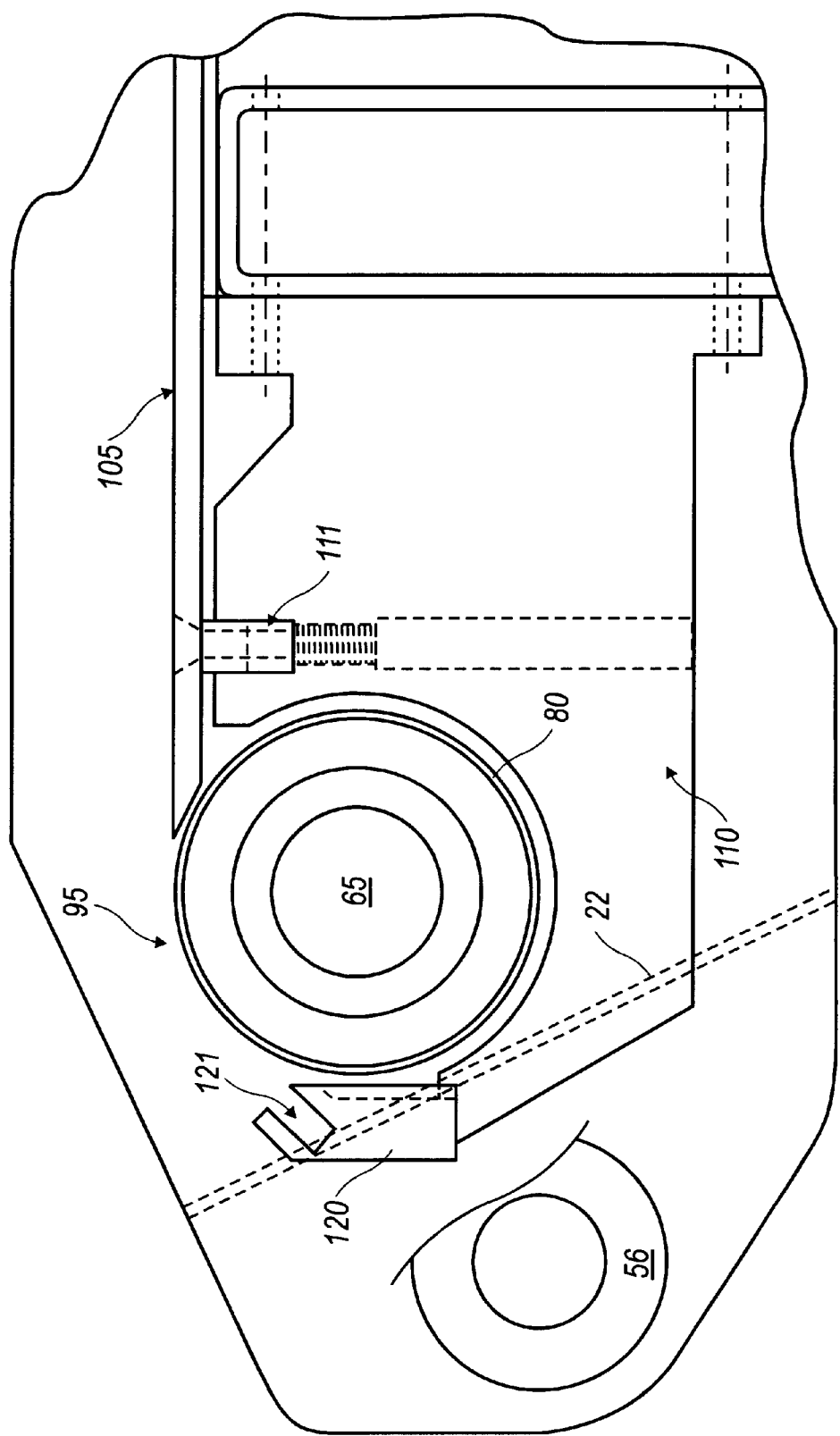
FIG. 3 is partial cutaway view of the forward end of the cantilever support table illustrating among other things, the adjustment mechanism for the belt pan.

A rotor hub 95 that covers each end of the rotor 65 is shown in FIG. 3. The hub 95 is circular in shape and constructed from non-magnetic material. The hub 95 is releasably attached to the rotor shaft 75 by threaded rotor bolts. An O-ring is interstitially positioned between the hub 95 and the skin 80 of the rotor 65 so that each is sealingly engaged upon the other thereby containing the magnets 70 away from trash and ferrous particles that may be attracted thereto and cause damage. In a preferred embodiment, the outer edge of a hub 95 is located at least one and one-half inch outwardly away from the distal ends of the magnets 70. By doing so, ferrous particles are less likely to be migrate around the belt 10 and to the rotor 65 where such particles do the greatest damage. This is so because the attractive magnets are resultingly positioned interiorly away from the edge of the conveyor belt 10.

FIG. 1 is illustrative of the frame 25 of the present invention upon which various components are mounted. The frame 25 includes a base stand 100 having two or more horizontal legs 34, two or more vertical legs 35 and two or more diagonal legs 37 connected therebetween. Each leg is secured to the other by means such as welding. The diagonal legs 37 extend upwardly and backwardly from a front portion of a horizontal leg 34 to a top portion of a vertical leg 35 which is also attached to the horizontal leg 34, but at a rearward location. Together, the vertical legs 35 extend upwardly at the rearward portion of the frame 25 and are attached to the cantilever table 20 of the apparatus. This cantilever design of the frame 25 and table 20 assures that a single operator can easily access any area of the separator 05 should operation or maintenance require such without the need to remove major frame sections or components.

The table 20 is secured by welding it to the upward and rearward portion of the frame 25 and provides a supporting surface for the conveyor belt 10 to slidingly operate upon when circulated around the magnetic rotor 65 and rear belt pulley 60. The table 20 is comprised of a plurality of rectangular cross-members and rectangular tubing. Both ends of each cross-member are weldedly secured perpendicular to forward and rearward rectangular tubing running parallel to the rotation of the belt 10. Each tubing extends upwardly above the upward portion of the cross-members and downwardly towards the downward portion. The tubing runs forwardly and rearwardly beyond the cross-members. The tubing is strengthened by a series of tubing stiffeners 22 running nearly perpendicular from the bottom portion of the tubing towards the top end. The tube stiffeners 22 are cylindrical rods welded at each end to the tubing.

The rectangular tubing provides a member upon which the conveyor belt drive material guards 40 are attachable. The material guards include a guard rail 41 and a plurality of rectangular plates 42 connected to the rail 41 where the plates 42 have elongate slots or holes therethrough. The quick-release hand knobs 50 screw down onto the rectangular plates 42 and into the tubing securing the guards 40 thereto. The knobs 50 are able to be manually backed off of the plates 42 thereby allowing the material guard 40 to be quickly removed. Running lengthwise along the belt 10 is the guard rail 41 to which the rectangular plates 42 are attached. The guard 40 further includes a flexible plastic polymer strip 43 that extends downwardly adjacent to the conveyor belt 10. By this configuration, the guard 40 aids in reflecting material back towards the center of the belt 10 during operation. Material guards 40 are provided for both sides of the belt 10.

Figure 2:
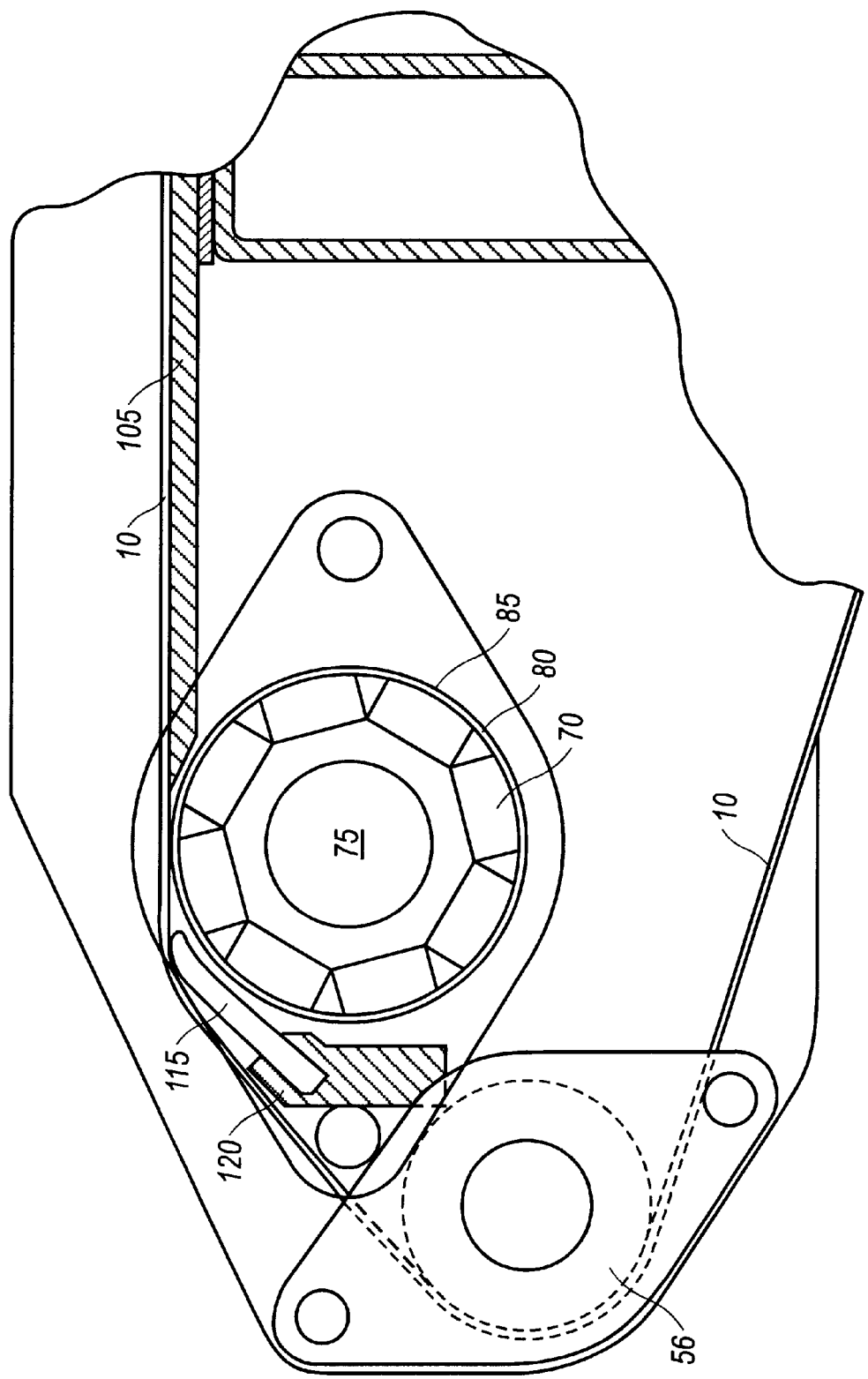
FIG. 2 is a partial cutaway and partially cross-sectioned view of a forward end of the separator illustrating a configuration of the magnetic rotor with respect to the cantilever support table.

A planar belt pan 105 reaches across towards the rectangular tubing 21 and is supported by the upward portions of the cross-members 23. The pan 105 extends forwardly towards the magnetic rotor 65 and rearwardly towards the belt drive pulley 60. The pan 105 functions to support the conveyor belt 10 and material carried thereupon as such material is transported across the apparatus 05. As illustrated in FIG. 2, the pan 105 curvedly extends over a portion of the magnetic rotor 65 thereby aiding in preventing material from becoming lodged at the rotor 65. FIG. 3 illustrates a belt pan stiffener 110. The pan stiffeners 110 include adjustment bars 111 that engage the forward portion of the belt pan 105 and aid in adjusting the height of the pan 105 over the magnetic rotor 65. With this adjustment feature, the separator 05 can be configured to convey material for processing very closely to the magnetic rotor 65 while preventing potentially damaging contact therewith. In the preferred embodiment, the stiffener 110 is at least partially constructed from a phenolic composition that is not attracted to the magnetic field created by the rotor 65 and provides sufficient rigidity to stiffen the semi-flexible belt pan 105 close to the rotor 65 where the pan 105 is otherwise unsupported.

The conveyor belt 10 is a continuous band without seams and runs forwardly at a top portion toward the magnetic rotor 65 during operation and oppositely and rearwardly back toward the belt drive pulley 60 at a lower portion. The belt drive pulley 60 drives the conveyor belt 10. In the preferred embodiment, the belt 10 is composed of non-magnetic flexible material such as two-ply poly-rubber or polyurethane.

Aiding in rotating the belt 10 around the table 20 is a plurality of belt idlers 57, including a nose idler 56 illustrated in FIGS. 2 and 3. Similar to the belt 10, the belt idlers 57 are composed of non-magnetic flexible material phenolic in nature. When located close to the rotor 65, the belt idlers 57 are positioned downwardly from the rotor 65 and horizontally across the table 20. The nose idler 56 is the most forward of all idlers 57 and supports the separation process by aiding in projecting material off of the belt 10. Movement of the conveyor belt 10 is from the forward nose idler 56 downward below the rotor 65, under the next idler 57, toward the belt drive pulley 60, upward over the belt pan 105, forward along the belt pan 105 towards the magnetic rotor 65, over the magnetic rotor 65 and then back downwardly toward the nose idler 56 where the rotational cycle starts over again.

A wiper 15 is illustrated in FIG. 1 which is secured across the belt 10 by means of a vulcanizing process. The wiper 15 or wipers 15 aid in removing ferrous material lodged above the magnetic rotor 65 due to the attractiveness of the magnetic field or other objects that would perpetually roll backward upon the belt 10. In operation, the wiper 15 pushes the ferrous particles away from the attractive magnetic field of the magnetic rotor 65 and off of the end of the conveyor belt along with other riding debris.

A series of one or more tile bars 115 positioned forwardly over the magnetic rotor 65 assist in carrying material moving along the belt 10 off of the magnetic separation apparatus 05. In a preferred embodiment, one continuous tile bar 115 extending along the length of the magnetic rotor 65 is utilized. Through experimentation, it has been learned that one continuous tile bar 115 is less likely to be damaged by ferrous material traveling over the rotor 65 that is pulled downwardly onto the tiles 115 by the magnetic attraction of the rotor 65 than if a series of tile bars 115 are utilized. The fragile nature of a plurality of tiles 115 stems from corner portions thereof being structurally weaker and brittle. When several tiles 115 are used instead of one long tile 115, the number of weaker corners is significantly increased and placed in the conveyance path when each is more prone to be struck by damaging objects. The material from which the tile bar 115 is constructed must be able to endure a tremendous amount of abrasion and heat generated by the belt 10 rubbing or traveling thereover during operation. It should also be non-magnetic in nature. In a preferred embodiment, ceramic tile bars 115 have proven to be a superior material in meeting the above criteria, because of ceramic's resistance to friction and abrasion.

Figure 5:
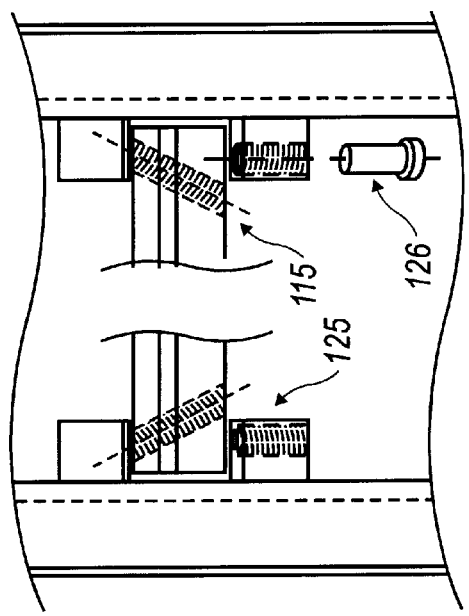
FIG. 5 is a front elevational view, in partial cross-section, illustrating the adjustment mechanism for the tile bar support.
Figure 4:
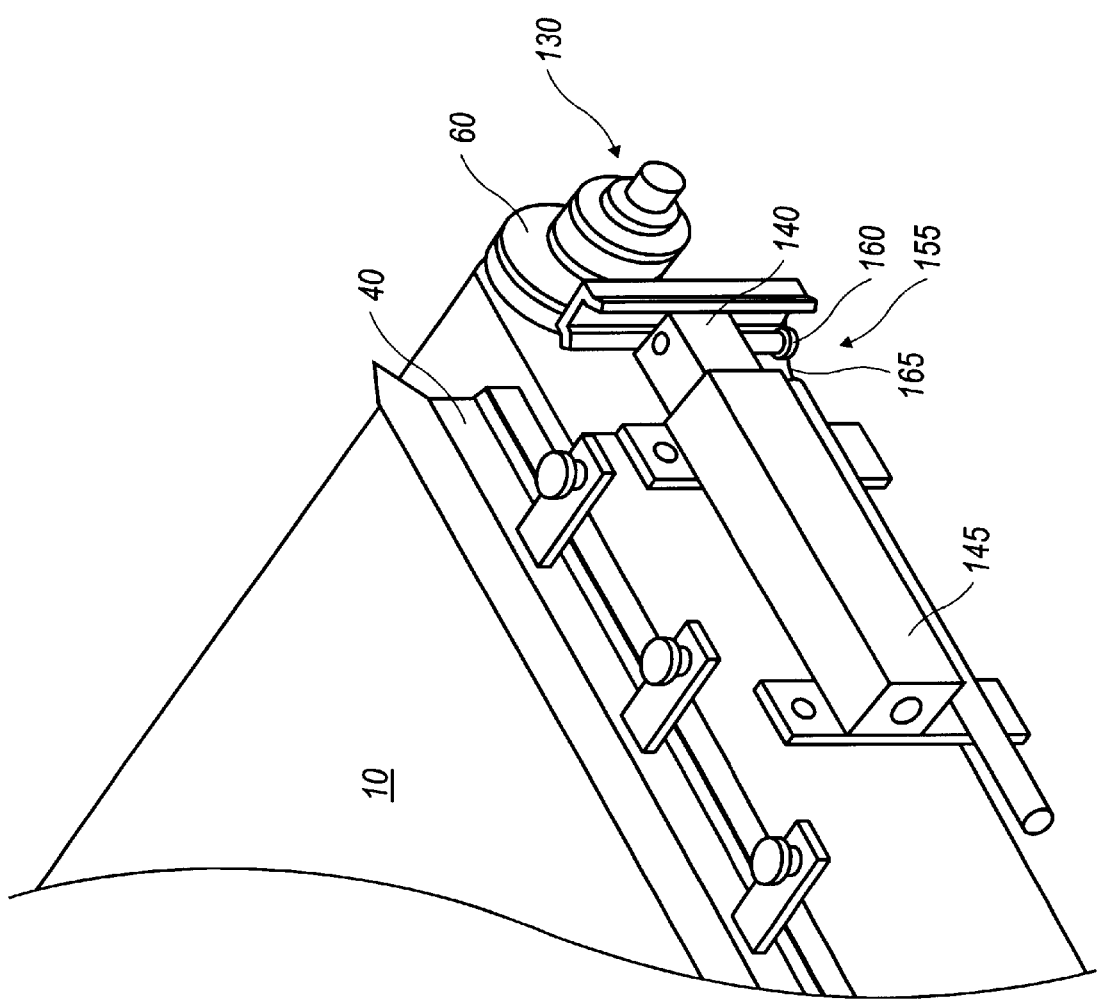
FIG. 4 is a perspective view of the belt release and adjustment mechanism.

The tile bar 115 is positioned over the magnetic rotor 65 by means of a tile bar support 120 illustrated in FIGS. 2 and 3. The tile bar support 120 runs parallel to the magnetic rotor 65 with the ends of the support 120 positioned adjacent to the rectangular tubing of the table 20. The support 120 is nearly pentagonal in cross-sectional shape, with two sides nearly perpendicular to the base support of the frame 25, a bottom side parallel to the base support 30, and two top sides at nearly 45 degree and 135 degree angles to a horizontal plane. A slotted groove 121 is provided centrally along one of the angled sides of the support 120 for supplying the means or mechanism by which the tile bar 115 is positioned over the magnetic rotor 65. The tile bar 115 is advantageously secured to the support 120 by nylon screws that are non-magnetic in composition. As may be appreciated in FIG. 5, the tile bar 115 may be raised or lowered over the magnetic rotor 65 by means of a plurality of tile bar adjustment bars 125 secured by welding to the forward inside ends of the rectangular tubings of the table 20. A plurality of adjustment screws 126 threadedly received by the adjustment bars 125 function to adjust the tile bar support 120 forward and backward and up and down, thereby adjusting the position of the tile bar 115 over the magnetic rotor 65.

Figure 9:
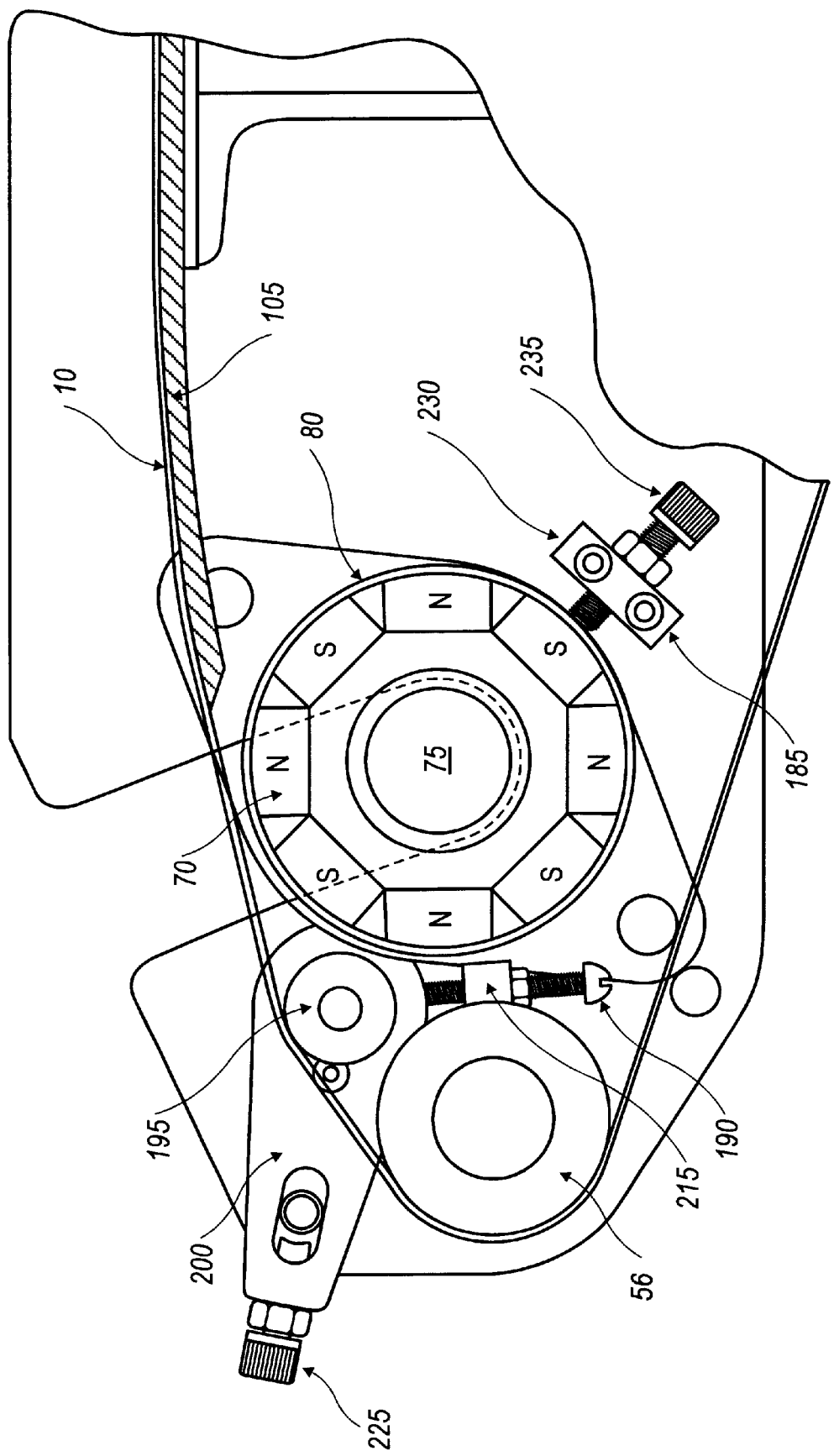
FIG. 9 is a side view of a drop nose rotor.

Referring to FIG. 9, a side view of a drop nose rotor according to an embodiment of the present invention is illustrated. As shown, the belt drop idler 195 and return idler 56 aide in rotating the belt 10 around the table 20. This design results in a tight and compact configuration of the conveyor belt 10 around the magnetic rotor 75 without requiring a large secondary rotating pulley. As a result of this design, a shorter conveyor belt 10 is used. The belt drop idler 195, belt return roller 56, front belt slider pan 105, and belt idler adjuster and bearing housing 200 are preferably constructed from fiberglass and/or composite materials. Due to the location of these parts to the magnetic rotor, the use of such material is preferred due to the build up of heat in the magnets 70. In addition, this design allows for the conveyor belt 10 and material on the belt 10 to pass over the magnetic rotor 65 with no rotating or stationary parts between the conveyor belt 10 and magnetic rotor 65. As a result, the material on the belt 10 is subjected to the full benefit of the eddy current field.

The belt drop idler 195 is adjustable in both the horizontal and vertical directions, thus effecting the angle of the conveyor belt with respect to the magnetic rotor 65. For example, if the belt drop idler 195 is adjusted towards the front of the machine and level with the magnetic rotor 65, the conveyor belt 10 is forced to follow this path causing rejected material to travel farther, e.g., past the magnetic rotor 65, before it can fall. If the belt drop idler 195 is mover closer to the and below the magnetic rotor 65, then the rejected material drops off rapidly. Thus, the positioning of the belt drop rotor 195 with respect to the magnetic rotor 65 affects different materials differently, thereby resulting in better separation.

A drop idler height adjuster 190 is used to adjust the height of the belt drop idler 195. In the preferred embodiment, the drop idler height adjuster 190 includes a threaded support 215 for receiving a screw 220. A belt idler adjuster and bearing housing 200 is used to adjust the conveyor belt 10 in the vertical direction. For example, adjusting the screw 220 in a clockwise position results in the belt drop idler being raised in the vertical direction. The belt idler adjuster and bearing housing 200 includes a screw 225 for adjusting the vertical position of the belt drop idler 195. For example, adjusting the screw in the clockwise direction results in the belt drop idler 195 moving closer to the magnetic rotor 75.

A rotor height adjuster 185 is used to adjust the height of the magnetic rotor 65. In a preferred embodiment, the rotor height adjuster 185 includes a threaded platform 230 and a screw 235. To adjust the height of the magnetic rotor 65, a drop nose rotor high density rotor guard and belt slider support according to an embodiment of the present invention is illustrated.

Figure 10:
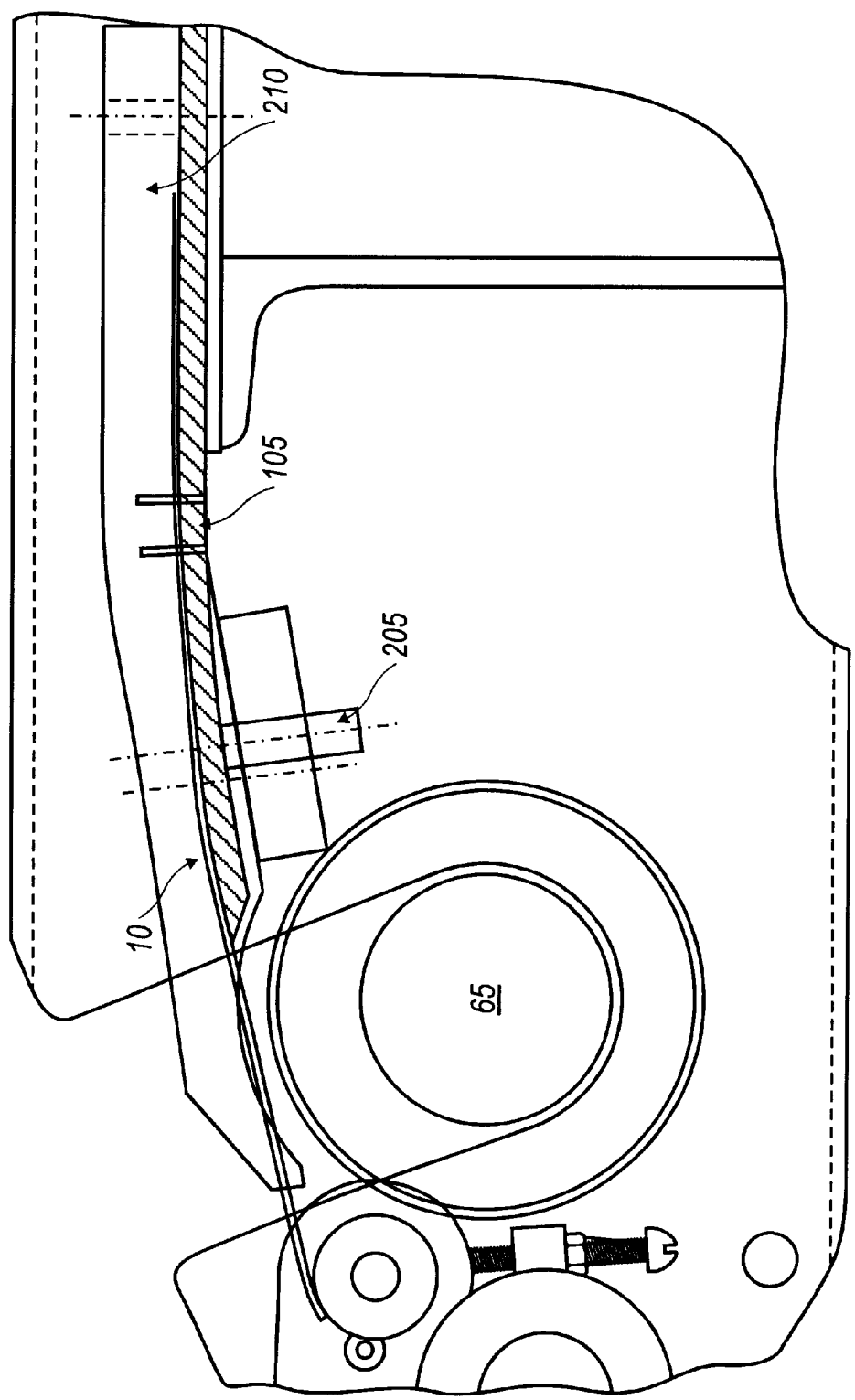
FIG. 10 is a side view of the drop nose rotor high density rotor guards and belt slider support.

As shown in FIG. 10, the vertical position of the front belt slider pan 105 can be adjusted using the front belt slider stiffener and height adjuster. Adjusting the position of the front belt slider pan 105 changes the path of the conveyor belt 10 with respect to the magnetic rotor 65, thus effecting the strength of the eddy current field on the materials on the conveyor belt 10. For example, some non-ferrous materials, such as light, flaky aluminum, react better to a weaker eddy current field. Thus adjusting the height of the front belt slider pan 105 affects the performance of the separator.

The combination of the versatility of the adjustable belt drop idler 195, magnetic rotor height adjuster 185 and the adjustable front belt slider pan 105 affects the approach angle of the conveyor belt 10 and material on the conveyor belt 10 with respect to the magnetic rotor 65. As a result, the strength of the eddy current field on the material on the conveyor belt can be adjusted as needed by the user.

Figure 11:
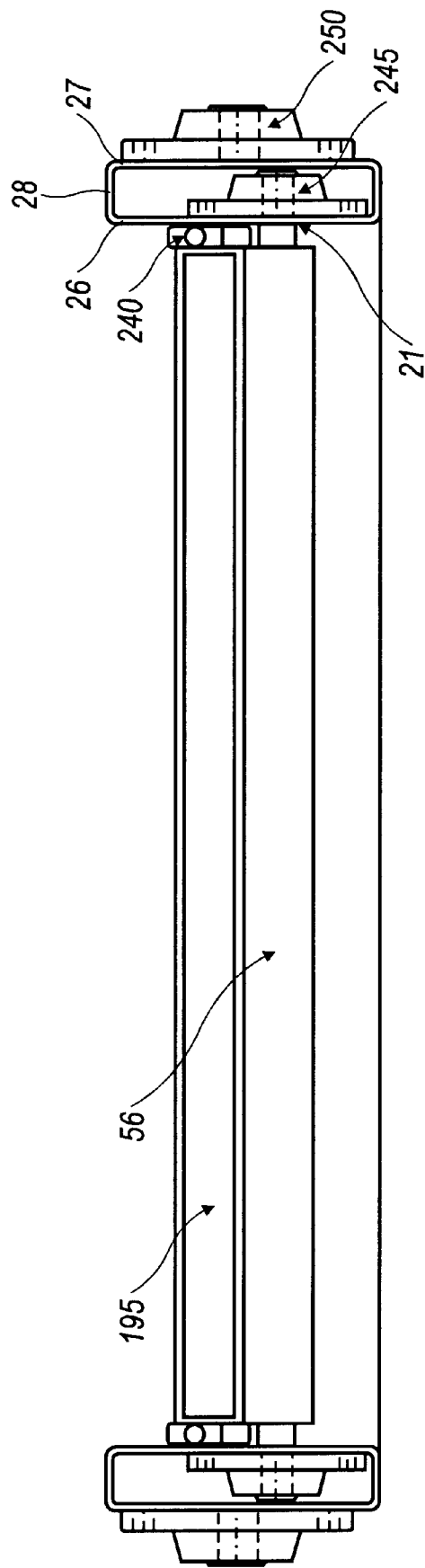
FIG. 11 is a perspective view of the rotating machine head parts overview.
Figure 12:
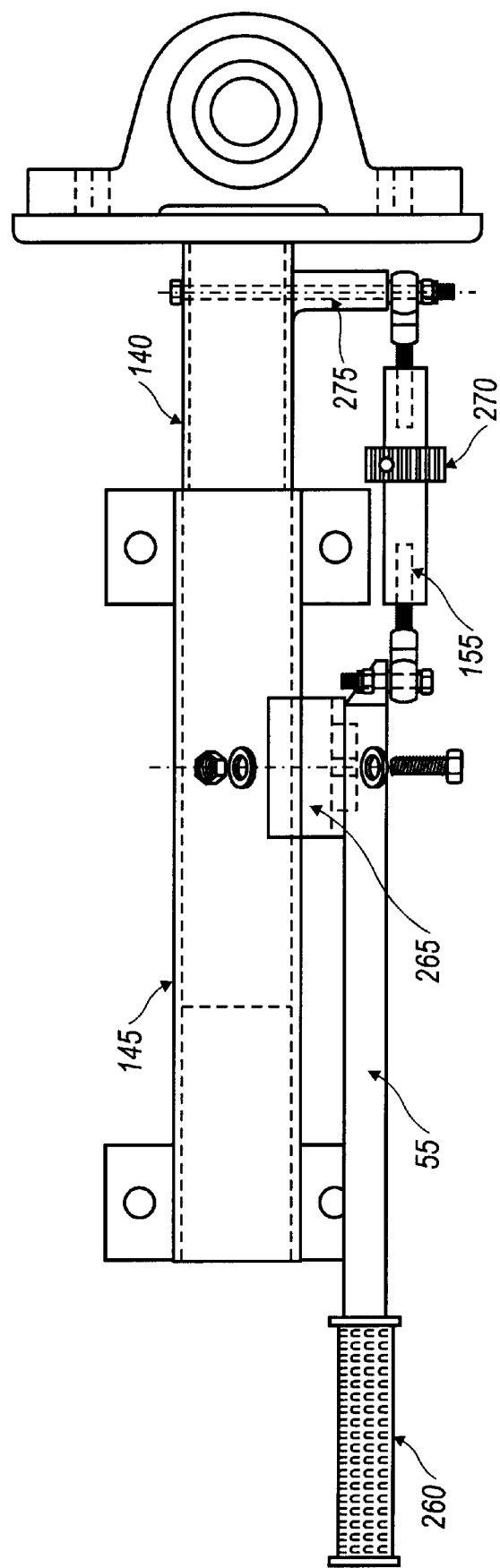
FIG. 12. is a detailed view of the quick release handle.

Referring to FIGS. 9 and 11, the rotating machine head parts are illustrated. As shown, the eddy current separator 05 is further streamlined, at least in a widthwise sense, by positioning a plurality of bearings on interior and/or exterior surfaces of interior 26 and exterior 27 walls of tubular portions of the frame members 21. The spaced apart arrangement of the interior wall 26 from the exterior wall 27 establishes a gap space 28 therebetween. Because of the tubular construction of the frame member 21, this gap space creates an enclosure within which, in the illustrated embodiment, bearings 245 for the return roller 56 are enclosed. Bearings 240 for the belt drop idler 195 are coupled to the interior wall 26 at an exterior surface thereof. Bearings 250 for the magnetic rotor 75 are coupled to the exterior wall 27 at an exterior surface thereof. In this manner, the three bearing arrangements for the different rotary arrangements are kept separated one from the others by the tubular construction of the frame member 21. In this configuration, the bearing arrangement 245 for a return roller 56, the bearing arrangement 240 for the belt drop idler, and the bearing arrangement 250 for the magnetic rotor 75 are each coupled to the tubular support frame 21. The several bearing arrangements 240, 245, 250 are further arranged to be at least partially horizontally overlapped, each one to the others, thereby widthwise streamlining the eddy current separator. This configuration also advantageously allows the magnetic rotor 75, the belt drop idler 195 and the return roller 56 to be located in close proximity to one another by the coupling of the bearing arrangements on three different surfaces of the frame tube 21.

A pair of motors (not shown) are provided for driving the magnetic rotor 65 and belt rotor 60. Drive guards 45 are utilized for covering motor belts. In a preferred embodiment, the motors are variably speed adjustable. Analog controls allow the operator to individually and separately adjust the speed of the rotatable belt drive pulley 60 and the magnetic rotor 65 by ramping up or down the respective speed of the appropriate drive motor.

The rear belt drive pulley 60 is mounted to the table 20 by means of a spherical or ball-and-socket type bearing or joint 130 at each end of the rotor 60. The bearing 130 is configured so that the pulley 60 is able to pivot 360 degrees about a center point of the bearing 130 within a conical solid having the center point of the bearing 130 as its apex. Pivoting the belt rotor 60 releases tension from, or places tension upon the conveyor belt 10. The bearing 130 is boltedly attached to the end of an extension support 135, the extension support 135 itself being attached by bolts to an outboard portion of the rectangular tubings of the table 20.

Referring to FIGS. 4, 5, 12, 13A, and 13B, the conveyor belt quick release is illustrated. The extension support 135 includes a smaller inner sleeve 140 slidably oriented within a larger sleeve 145. There is an extension plate attached perpendicularly to the end of the inner sleeve 140 by welding. The extension plate provides the means by which the joint 130 is boltedly attached to the extension support 135. The outer sleeve 145 of the extension 135 is the portion attached to the tubing. A lever 55 swingably mounted to a bottom portion of the outer sleeve 145 of the extension support 135 serves as a means for manually extending and retracting the inner sleeve 140 of the support 135.

Figures 13A, 13B:
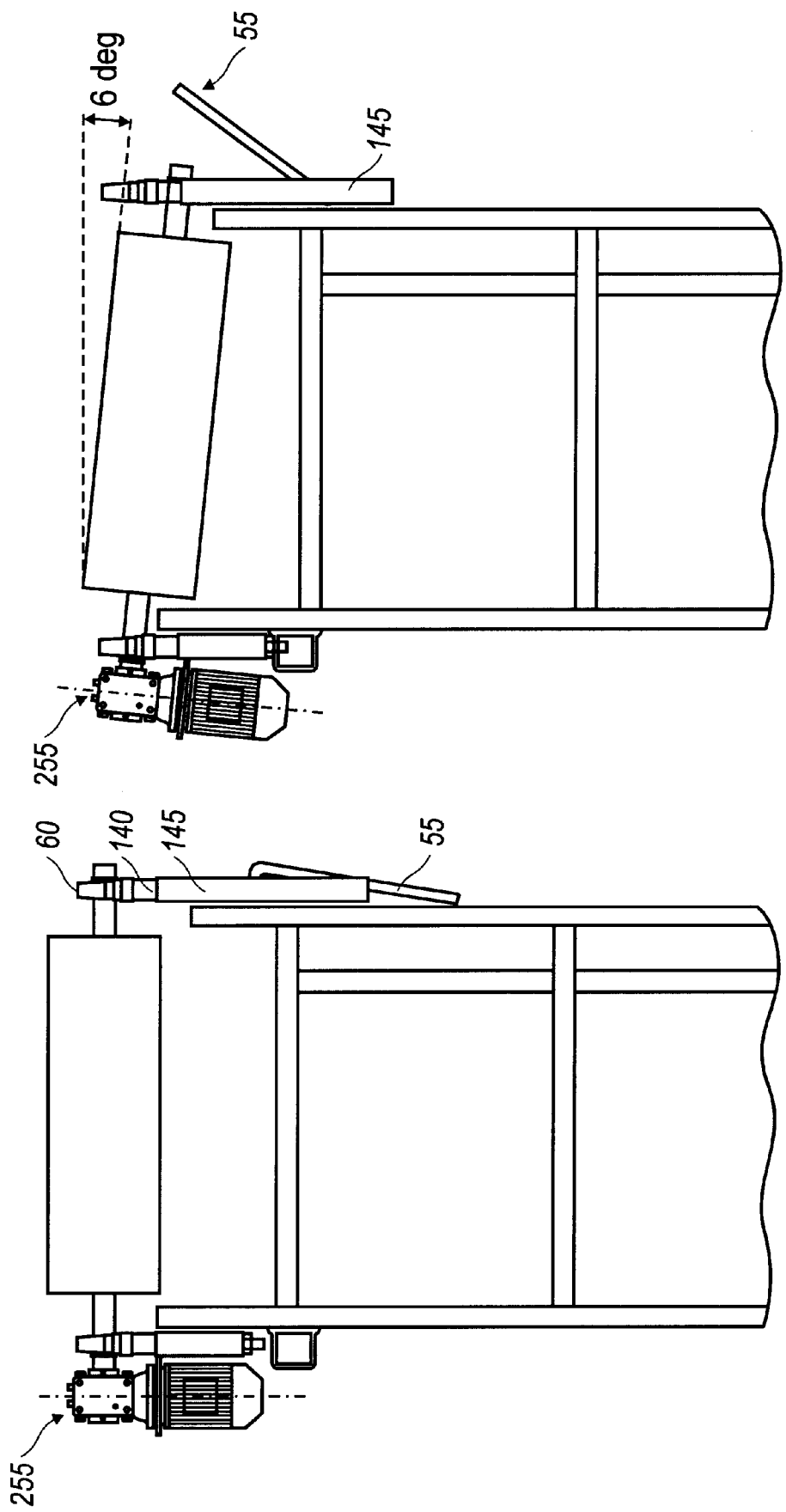
FIGS. 13A and 13B are top views of the conveyor belt quick release positions.

As shown in FIG. 13A, when the lever 55 is utilized to extend the inner sleeve 140 thereby placing tension on the conveyor belt 10, the position of the lever 55 is nearly parallel to the tubing support of the table 20 and is pointing away from the belt drive pulley 60 and toward the center of the table 20. As shown in FIG. 13B, when the lever 55 is utilized to retract the inner sleeve 140 thereby releasing tension on the conveyor belt 10, the position of the lever 55 is nearly parallel to the side tubing of the cantilever table 20, but pointing toward the belt drive pulley 60. Thus by pulling on the lever 55, the inner sleeve 140 may be retracted into the support 135 at about six degrees (60) from closer to the separator compared to when the inner sleeve 140 is fully extended. As a result, the entire group of components (conveyor belt drive pulley, pulley shaft, gear reducer, and drive motor) 255 also moves when the lever is pulled. To reduce the amount of pressure needed to move the handle 55 from the locked position to an open position, a spring (not shown) is used to hold the handle 55 in the locked position.

The lever 55 is basically cylindrical in shape with a hand grip 260 provided at a distal end, and at the other end a plate or pivoting bracket 265 extends outwardly for connection to a fine-pitch adjustment rod 155. The rod 155 is connected to the lever 55 in such a manner that when the inner sleeve 140 is extended, an outward or extension force is exerted on the inner sleeve 140 that ultimately drives the forward spherical bearing 130 and a forward end of the belt rotor 60 outwardly away from the frame 25 thereby tightening the belt 10.

The fine-pitch adjustment rod 155 takes the form of a bolt secured at one end to the lever 55 and at the other end coupled to a pin extending downwardly through a spacer to the inner sleeve 140 proximate the plate. The adjustment rod 155 includes a pair of threaded eye screws 160 connected by means of an elongated nut 165 or hand grip 270. The eye screws 160 are threadedly engaged to the nut 165 or hand grip 270 such that by rotating the nut 165 or hand grip 270 the inner sleeve 140 is finely extended or retracted in a turnbuckle manner. In so doing, tension on the conveyor belt 10 is able to be commensurately finely adjusted. More importantly, the relative positions of the opposite ends of the belt drive pulley 60 may be finely adjusted with respect to the table 20 thereby affecting the tracking or travel of the belt 10 without the need of tools. In this manner, the belt 10 may be accurately adjusted if it is tending to ride to one side or the other during operation.

By retracting or constricting the extension support 135 and unscrewing the quick-release hand knobs 50 thereby facilitating the removal of the forward material guard 40, the conveyor belt 10 is easily and quickly removed from the table 20 by a single operator. This simplicity in removal and installation of the belt 10 is also made possible by the cantilever design of the frame 25 of the separator 05. Since there are no forward vertical support legs attached to table 20 at the forward side, no hoisting of equipment or cutting of belts is required for making repairs to the separator 05.

In operation, material is delivered to a rearward end of the rotating conveyor belt 10 near the belt drive pulley 60. The material is rapidly carried forward over the rotating magnetic rotor 65 by the belt's 10 travel. The forward velocity of the objects and particles upon the belt 10, together with the eddy current force created by the magnetic rotor 65 causes the non-ferrous metals to be lifted or boosted off of the belt 10 and projected further out from the separator than other debris.

Process instrumentation is located in a central control box and facilitates operator control of the separator 05. A plurality of analog or digital controllers are provided for regulating belt 10 speed and the speed of the magnetic rotor 65. Discrete on/off switches which are incorporated into the control system provide means for starting and stopping the equipment 05. Still further, an emergency push-stop override control may be located in the control box thereby providing a safety feature for automatically halting the operation of the separator 05. A hand-held portable remote control device may also be incorporated to be electrically connected to the equipment by way of the control panel to provide an operator an interface for controlling the equipment 05 from a distance. With such a remote device, the operator can start and stop the separator 05 and independently regulate belt 10 speeds remotely.

A magnetic separator and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

INDUSTRIAL APPLICABILITY

The present invention finds applicability in the resource reclamation industries.

What is claimed and desired to be secured by Letters Patent is as follows:

1. An eddy current separator apparatus for separating non-ferrous metals from other materials, said apparatus comprising:

a support frame;
a table cantileverly suspended from said frame;
an expansion and contraction mechanism adapted to accept a continuous conveyor belt thereabout, said expansion and contraction mechanism configurable between an operating configuration and maintenance configuration;
a continuous conveyor belt loopable about said expansion and contraction mechanism and said table, said continuous conveyor belt being drawn tight in said operating configuration and slackened in said maintenance configuration, said continuous conveyor belt being easily removed from and installable onto said table in said maintenance configuration; and
a magnetic rotor located at a distance interiorly of a first side of said continuous conveyor belt, said magnetic rotor adapted to generate an eddy current on an opposite second side of said continuous conveyor belt upon rotation.

2. An eddy current separator apparatus for separating non-ferrous metals from other materials, said apparatus comprising:

a support frame;
a table cantileverly suspended from said frame;
an expansion and contraction mechanism adapted to accept a continuous conveyor belt thereabout, said expansion and contraction mechanism configurable between an operating configuration and maintenance configuration;
a continuous conveyor belt loopable about said expansion and contraction mechanism and said table, said continuous conveyor belt being drawn tight in said operating configuration and slackened in said maintenance configuration, said continuous conveyor belt being easily removable from and installable onto said table in said maintenance configuration;
an eddy current generator located interiorly at a distance from said continuous conveyor belt in said operating configuration;
a protective enclosure for said eddy current generator to prevent access by ferrous metal to said rotating magnetic assembly;
said eddy current generator being positioned in said operating configuration between a belt drive pulley and a belt idler; and
a variable speed motor for adjusting a rate of rotation of said eddy current generator for adjusting a magnitude of an eddy current force generated by said eddy current separator.

3. The apparatus of claim 2, wherein said magnetic rotor being positioned between a belt drive pulley and a belt idler when in said operating configuration.

4. The apparatus as recited in claim 2, wherein said expansion and contraction mechanism includes a positionally adjustable pulley.

5. The apparatus as recited in claim 2 wherein said eddy current generator further comprising:

a magnetic rotor located interiorly of said continuous conveyor belt, said magnetic rotor adapted to generate an eddy current on an outside of said continuous conveyor belt upon rotation.

6. The apparatus as recited in claim 2 wherein said magnetic rotor further comprising:

a rotor shaft having a plurality of magnets positioned peripherally thereabout, each of said magnets having both north and south poles aligned on an axis of polarity; and each of said magnets being arranged upon said rotor shaft so that said axis of polarity is radially configured outwardly from a longitudinal axis of said rotor shaft such that one of said north and south poles is located distally away from said longitudinal axis of said rotor shaft and the other of said north and south poles is located proximately toward said longitudinal axis of said rotor shaft.

7. The apparatus as recited in claim 6 wherein at least fifty percent of said distally located magnetic poles are north poles.

8. The apparatus as recited in claim 6 wherein at least fifty percent of said distally located magnetic poles are south poles.

9. The apparatus as recited in claim 2 wherein said expansion and contraction mechanism includes a drive pulley adjacent said table, said drive pulley having a first position that draws said continuous conveyor belt tight when said expansion and contraction mechanism is in said operating configuration and said drive pulley having a second position that slackens said belt when said expansion and contraction mechanism is in said maintenance configuration.

10. The apparatus as recited in claim 9 wherein said expansion and contraction mechanism includes a lever to configure said drive pulley, said lever having an operating position and a maintenance position to move said drive pulley between said first and second positions.

11. The apparatus as recited in claim 10 wherein said lever further includes an adjuster for precise positioning adjustment of said drive pulley.

12. An eddy current separator apparatus for separating non-ferrous metals from other materials, said apparatus comprising:
    a support frame;
    a table cantileverly suspended from said frame;
    an expansion and contraction mechanism adapted to accept a continuous conveyor belt thereabout, said expansion and contraction mechanism configurable between an operating configuration and maintenance configuration;
    continuous conveyor belt loopable about said expansion and contraction mechanism and said table, said continuous conveyor belt being drawn tight in said operating configuration and slackened in said maintenance configuration, said continuous conveyor belt being easily removable from and installable onto said table in said maintenance configuration;
    an eddy current generator located interiorly at a distance from said continuous conveyor belt in said operating configuration; and
    a protective enclosure for said eddy current generator to prevent access by ferrous metal to said rotating magnetic assembly.

13. The apparatus as recited in claim 12 wherein said eddy current generator being positioned in said operating configuration between a belt drive pulley and a belt idler.

14. A process for allowing a single operator to exchange a continuous conveyor belt of an eddy current separator apparatus, comprising the steps of:
    providing an eddy current separator including:
        a support frame;
        a table cantileverly suspended from said frame;
        an expansion and contraction mechanism adapted to accept said continuous conveyor belt thereabout, said expansion and contraction mechanism configurable between an operating configuration and maintenance configuration, said continuous conveyor belt loopable about said expansion and contraction mechanism and said table, said continuous conveyor belt being drawn tight in said operating configuration and slackened in said maintenance configuration; and
        an eddy current generator located interiorly at a distance from said continuous conveyor belt in said operating configuration;
    moving said expansion and contraction mechanism into said maintenance configuration to slacken said continuous conveyor belt; and
    exchanging said continuous conveyor belt.

15. The process as recited in claim 14, wherein exchanging said continuous conveyor belt further includes the steps of:
    providing a replacement belt;
    removing said continuous conveyor belt from said expansion and contraction mechanism and said table;
    looping said replacement belt over said table and said expansion and contraction mechanism; and
    moving said expansion and contraction mechanism into said operating configuration.

16. An eddy current separator apparatus for separating non-ferrous metals from other materials, said apparatus comprising:
    a support frame with a cantileverly table suspended thereupon;
    an expansion and contraction mechanism adapted to accept a continuous conveyor belt thereabout, said expansion and contraction mechanism configurable between an operating configuration and maintenance configuration;
    a continuous conveyor belt loopable about said expansion and contraction mechanism and said table, said continuous conveyor belt being drawn tight in said operating configuration and slackened in said maintenance configuration; and
    an eddy current generator located interiorly at a distance from said continuous conveyor belt in said operating configuration, said eddy current generator being positioned in said operating configuration between a belt drive pulley and a belt idler.

17. AD eddy current separator apparatus for separating non-ferrous metals from other materials, said apparatus comprising:
    a support frame;
    a table cantileverly suspended from said frame;
    an expansion and contraction mechanism adapted to accept a continuous conveyor belt thereabout, said expansion and contraction mechanism configurable between an operating configuration and maintenance configuration;
    a continuous conveyor belt loopable about said expansion and contraction mechanism and said table, said continuous conveyor belt being drawn tight in said operating configuration and slackened in said maintenance configuration, said continuous conveyor belt being easily removed from and instalable onto said table in said maintenance configuration;
    a magnetic rotor located at a distance interiorly of a first side of said continuous conveyor belt, said magnetic rotor adapted to generate an eddy current on an opposite second side of said continuous conveyor belt upon rotation; and an adjustable belt drop idler located interiorly of said first side of said continuous conveyor belt, said adjustable belt drop idler adapted to be adjustable with respect to said magnetic rotor thereby adjusting the eddy current on said opposite second side of said continuous conveyor belt.

18. The apparatus as recited in claim 17, said apparatus further comprising:

a belt drop idler adjuster attached to said adjustable belt drop idler, said belt drip idler adjuster adapted to move said belt drop idler vertically.

19. The apparatus as recited in claim 17, said apparatus further comprising:

a belt idler adjuster and bearing housing attached to said adjustable belt drop idler, said belt idler adjuster and bearing housing adapted to move said belt drop idler horizontally.

20. The apparatus as recited in claim 17, said apparatus further comprising:

a rotor height adjuster attached to said magnetic rotor, said rotor height adjuster adapted to move said magnetic rotor vertically.

21. The apparatus as recited in claim 17, said apparatus further comprising:

said support frame being at least partially tubularly constructed and having an interior wall spaced apart from an exterior wall, said interior wall and said exterior wall establishing a gap space therebetween; and a bearing for a return roller being positioned in said gap space inside said support frame.

22. The apparatus as recited in claim 21, said apparatus further comprising:

a bearing for said belt drop idler being coupled to said interior wall at an exterior surface of said interior wall.

23. The apparatus as recited in claim 21, said apparatus further comprising:

a bearing for said magnetic rotor being coupled to said exterior wall at an exterior surface of said exterior wall.

24. The apparatus as recited in claim 17, said apparatus further comprising:

a bearing for a return roller, a bearing for said belt drop idler, and a bearing for said magnetic rotor each being coupled to a tubular portion of said support frame and arranged to be at least partially horizontally overlapped, each to the others, thereby widthwise streamlining said eddy current separator.

25. The apparatus as recited in claim 17, said apparatus further comprising:

said support frame being at least partially tubularly constructed and having an interior wall spaced apart from an exterior wall, said interior wall and said exterior wall establishing a gap space therebetween; and one of a plurality of rotary support bearings being positioned in said gap space inside said support frame.

26. The apparatus as recited in claim 25, said apparatus further comprising:

another of said plurality of rotary support bearings being coupled to said interior wall at an exterior surface of said interior wall.

27. The apparatus as recited in claim 26, said apparatus further comprising:

another of said plurality of rotary support bearings being coupled to said exterior wall at an exterior surface of said exterior wall.

28. The apparatus as recited in claim 27, said apparatus further comprising:

said plurality of rotary support bearings being arranged to be at least partially horizontally overlapped, each to the others, thereby widthwise streamlining said eddy current separator.

* * * * *